United States Patent
Ando

(10) Patent No.: US 8,611,641 B2
(45) Date of Patent: Dec. 17, 2013

(54) METHOD AND APPARATUS FOR DETECTING DISPARITY

(75) Inventor: Hideki Ando, Tokyo (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 13/179,781

(22) Filed: Jul. 11, 2011

(65) Prior Publication Data

US 2012/0051624 A1    Mar. 1, 2012

(30) Foreign Application Priority Data

Aug. 31, 2010 (GB) .................................. 1014411.1

(51) Int. Cl.
*G06K 9/00* (2006.01)

(52) U.S. Cl.
USPC ............ 382/154; 382/106; 382/168; 382/266

(58) Field of Classification Search
USPC .................................. 382/106, 154; 356/496
See application file for complete search history.

(56) References Cited

U.S. PATENT DOCUMENTS

| | | | | |
|---|---|---|---|---|
| 5,535,002 A * | 7/1996 | Csipkes et al. | ................ | 356/496 |
| 5,577,130 A * | 11/1996 | Wu | ................ | 382/106 |
| 5,734,743 A * | 3/1998 | Matsugu et al. | ............. | 382/154 |
| 5,917,936 A * | 6/1999 | Katto | ............................ | 382/154 |
| 6,125,198 A * | 9/2000 | Onda | ............................ | 382/154 |
| 6,141,440 A * | 10/2000 | Melen | ........................... | 382/154 |
| 6,222,938 B1 * | 4/2001 | Melen | ........................... | 382/154 |
| 7,374,266 B2 * | 5/2008 | Walmsley et al. | .............. | 347/14 |
| 2005/0163366 A1 | 7/2005 | Zhang et al. | | |
| 2006/0120712 A1 * | 6/2006 | Kim | .............................. | 396/333 |
| 2009/0022393 A1 * | 1/2009 | Bar-Zohar et al. | ............ | 382/154 |

FOREIGN PATENT DOCUMENTS

| | | |
|---|---|---|
| GB | 2 244 621 A | 12/1991 |
| KR | 10-0778085 | 11/2007 |

OTHER PUBLICATIONS

United Kingdom Search Report issued Nov. 30, 2010, in Great Britain Patent Application No. 1014411.1, filed Aug. 31, 2010.

* cited by examiner

*Primary Examiner* — Vu Le
*Assistant Examiner* — Aklilu Woldemariam
(74) *Attorney, Agent, or Firm* — Oblon, Spivak, McClelland, Maier & Neustadt, L.L.P.

(57) ABSTRACT

An apparatus for detecting disparity is described. This apparatus detects the disparity between corresponding pixel positions in a first and second image capturing the same scene, the first and second image being viewable as a stereoscopic image captured using a parallel lens arrangement, the apparatus comprising: a determiner operable to determine the pixel positions of a plurality of points of change of an image property across a section of the first image and to determine the pixel positions of a plurality of points of change of said image property across a corresponding section of the second image; a comparator operable to compare the position of one of the points of change in the first image with a subset of the positions of the plurality of points of change of second image, whereby the subset is determined in accordance with the pixel positions of the points of change in the second image relative to the pixel position of the one of the points of change in the first image; wherein the determiner is operable to determine the similarity between pixels which have a pixel position adjacent the point of change in the first image, and the corresponding pixels adjacent each of the points of change in the subset; and an obtainer operable to obtain the disparity in accordance with the determined similarity of the pixels.

14 Claims, 9 Drawing Sheets

METHOD AND APPARATUS FOR DETECTING DISPARITY

BACKGROUND OF THE INVENTION

1. Field of the Invention

The present invention relates generally to a method and apparatus for detecting disparity.

2. Description of the Prior Art

As 3D television and cinematography is becoming popular, 3D editing effects are being increasingly used.

One 2D effect that is commonly used is multiplexing one image into another, second, image in 2D. An example of this is shown in FIG. 3, where a first image 300 and a second image 305 are to be mixed together. As can be seen in the resultant image 310, the toy bear and house from the first image 300 appear over the mask in the second image 305. In order to achieve this effect, a depth map of each pixel in each image is used to ensure that the positioning of artefacts in the resultant image appear correct. It is important to ensure that when two scenes are edited together, the mixed image appears to have artefacts in the correct physical space. In other words, it is necessary to know which artefact should be placed in the foreground and which should be placed in the background.

A prior art apparatus for achieving this is shown in FIG. 1. In FIG. 1, the first image 300 and the corresponding first depth map 1010 are fed into the mixing apparatus 1000. Additionally, the second image 305 and the second depth map 1020 are also fed into the mixing apparatus 1000. The depth of each pixel is compared from the first and second depth maps 1010 and 1020 in a map comparator 1025. This comparison results in the correct placing of each pixel in the resultant image. In other words, from the depth map it is possible to determine whether the pixel from the first image should be placed behind or in front of a corresponding pixel from the second image.

At each pixel position, the map comparator 1025 instructs a multiplexer 1035 to select for display either the pixel from the first image 300 or the pixel from the second image 305. This generates the mixed image 310. Further, the map comparator 1025 selects the depth corresponding to the selected pixel. This depth value is fed out of the mixing apparatus 1000 and forms the resultant depth map 1045 for the mixed image.

As noted above, as 3D editing is being more frequently required, there is a need to adapt this technique for 3D editing.

It is an aim of the present invention to try and adapt the above mixing technique to the 3D scenario.

SUMMARY OF THE INVENTION

According to a first aspect of the present invention, there is provided a method of detecting disparity between corresponding pixel positions in a first and second image capturing the same scene, the first and second image being viewable as a stereoscopic image captured using a parallel lens arrangement, the method comprising the steps of: determining the pixel positions of a plurality of points of change of an image property across a section of the first image; determining the pixel positions of a plurality of points of change of said image property across a corresponding section of the second image; comparing the position of one of the points of change in the first image with a subset of the positions of the plurality of points of change of second image, whereby the subset is determined in accordance with the pixel positions of the points of change in the second image relative to the pixel position of the one of the points of change in the first image; determining the similarity between pixels which have a pixel position adjacent the point of change in the first image, and the corresponding pixels adjacent each of the points of change in the subset; and obtaining the disparity in accordance with the determined similarity of the pixels.

This is advantageous because it allows a part occluded object in an image to be determined.

The subset may be determined as being within a predetermined number of pixels of the one of the points of change in the first image.

The predetermined number of pixels may be determined in accordance with the depth budget of the captured scene.

The method may comprise defining a non-occluded segment between the one point of change in the first image and an adjacent second point of change in the first image wherein pixels adjacent the one point of change and the pixels adjacent the second point of change have a similarity to the pixels adjacent corresponding points of change in the subset which is above a threshold value; and defining a part occluded section as being a segment adjacent to the non-occluded segment in accordance with a predetermined criterion.

The method may comprise determining the similarity of an image property of the pixels in the part occluded section in the first image with pixels in the second image located at pixel positions horizontally displaced to the pixels in the part occluded section in the first image; determining the respective ends of the part occluded section as being the pixel closest to the respective change points defining the part occluded section that have a similarity above a threshold.

The method may comprise defining a line between the pixels at the respective ends of the part occluded section, wherein the disparity at any pixel position in the part occluded section is determined in accordance with the defined line.

According to another aspect, there is provided a computer program containing computer readable instructions which, when loaded onto a computer, configure the computer to perform the method according to any one of the above.

According to another aspect, there is provided an apparatus for detecting disparity between corresponding pixel positions in a first and second image capturing the same scene, the first and second image being viewable as a stereoscopic image captured using a parallel lens arrangement, the apparatus comprising: a determiner operable to determine the pixel positions of a plurality of points of change of an image property across a section of the first image and to determine the pixel positions of a plurality of points of change of said image property across a corresponding section of the second image; a comparator operable to compare the position of one of the points of change in the first image with a subset of the positions of the plurality of points of change of second image, whereby the subset is determined in accordance with the pixel positions of the points of change in the second image relative to the pixel position of the one of the points of change in the first image; wherein the determiner is operable to determine the similarity between pixels which have a pixel position adjacent the point of change in the first image, and the corresponding pixels adjacent each of the points of change in the subset; and an obtainer operable to obtain the disparity in accordance with the determined similarity of the pixels.

The subset may be determined as being within a predetermined number of pixels of the one of the points of change in the first image.

The predetermined number of pixels may be determined in accordance with the depth budget of the captured scene.

The apparatus may comprise a definer operable to define a non-occluded segment between the one point of change in the first image and an adjacent second point of change in the first image wherein pixels adjacent the one point of change and the pixels adjacent the second point of change have a similarity to the pixels adjacent corresponding points of change in the subset which is above a threshold value; and to define a part occluded section as being a segment adjacent to the non-occluded segment in accordance with a predetermined criterion.

The determiner may be operable to determine the similarity of an image property of the pixels in the part occluded section in the first image with pixels in the second image located at pixel positions horizontally displaced to the pixels in the part occluded section in the first image; and to determine the respective ends of the part occluded section as being the pixel closest to the respective change points defining the part occluded section that have a similarity above a threshold.

The definer may be operable to define a line between the pixels at the respective ends of the part occluded section, wherein the disparity at any pixel position in the part occluded section is determined in accordance with the defined line.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 2:
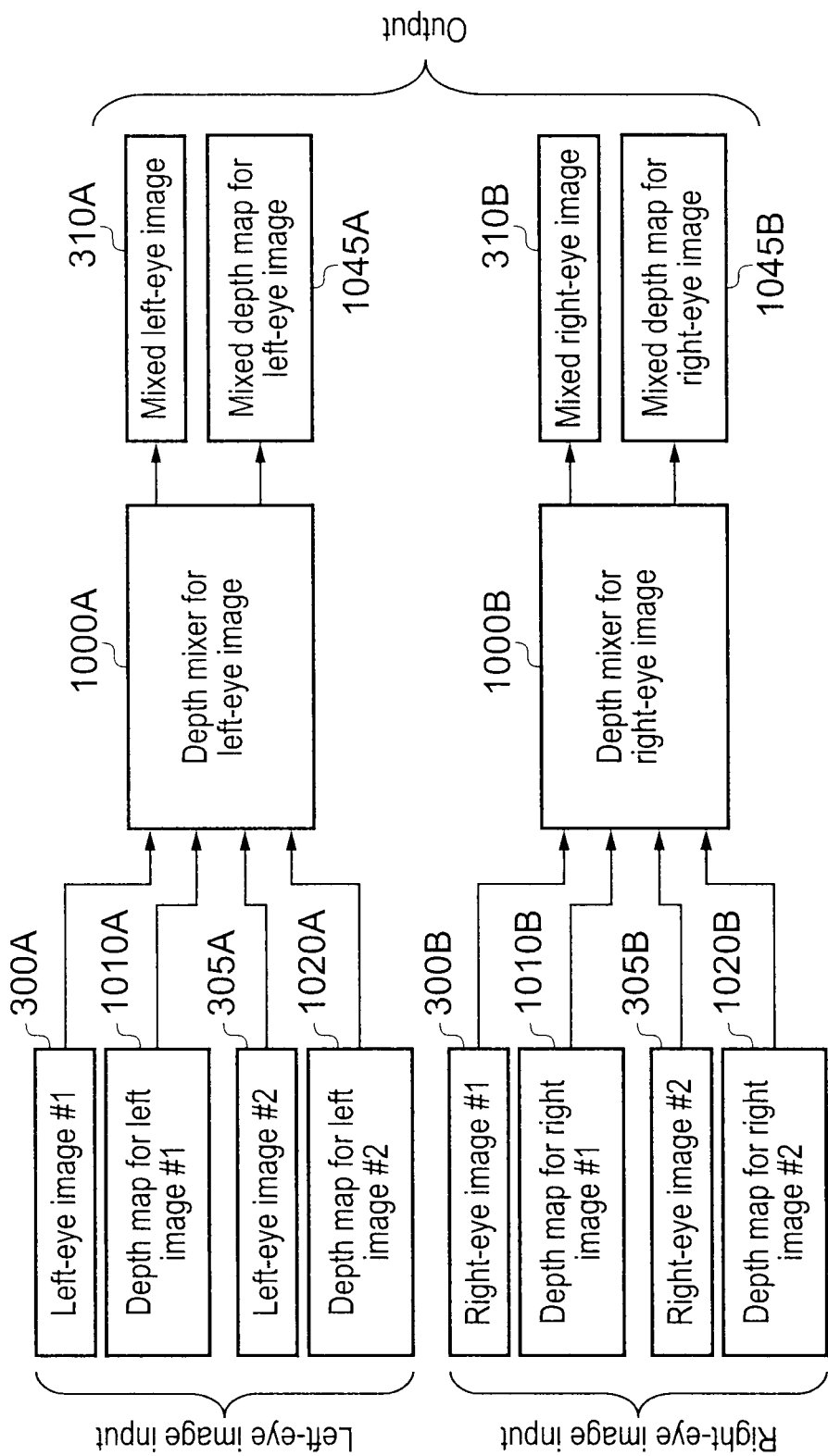
FIG. 2 shows a multiplexing apparatus for 3D image signals.
Figure 3:
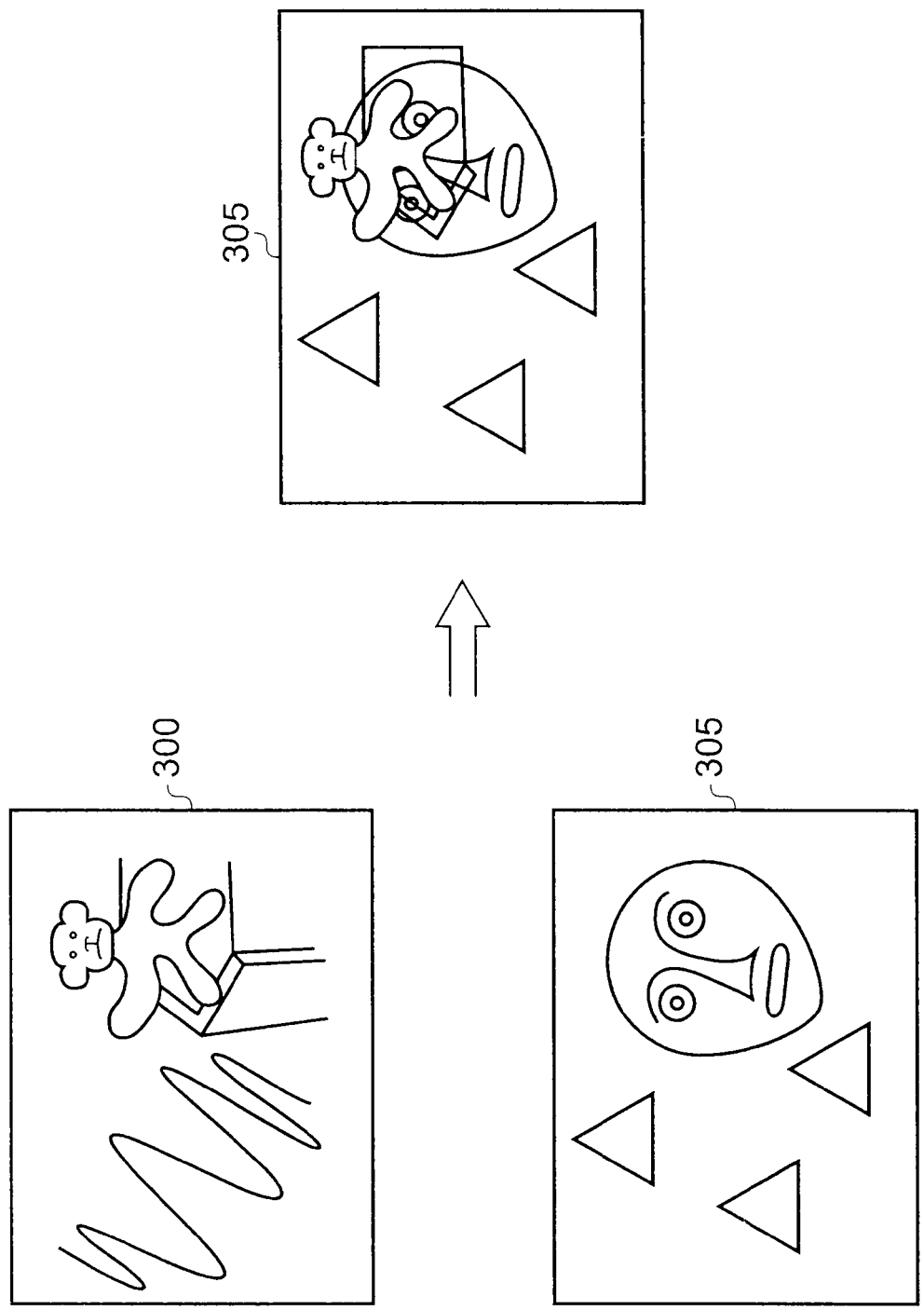
FIG. 3 shows a prior art resultant image signal from the apparatus of FIG. 1.

FIG. 2 shows an apparatus which may implement the above mixing technique in the 3D scenario. In the 3D scenario, the first image 300 has a left eye image 300A and a right eye image 300B. The left eye image is the version of the first image that is intended for the viewer's left eye and the right eye image is the version of the first image that is intended for the viewer's right eye. The left eye image 300A is a horizontally displaced version of the right eye image 300B. In every other respect, for non occluded areas ideally, the left and right image would be identical. In the case of determining the depth of each pixel in each image, it is possible to do this in two ways. The first is to generate a depth map for each image. This provides a depth value for each pixel in the image. The second is to generate a disparity map which provides details of the difference between pixels in the left eye image 300A and the right eye image 300B. In the example of FIG. 2, a depth map 1010A is provided for the left eye image and a depth map 1010B is provided for the right eye image. From these depth maps, it is possible to calculate a disparity map which provides the difference in pixel position between corresponding pixels in the left eye image and the right eye image. However, as the skilled person will appreciate, to calculate disparity maps, camera parameters such as the angle of field and the interocular distance are also required.

Figure 1:
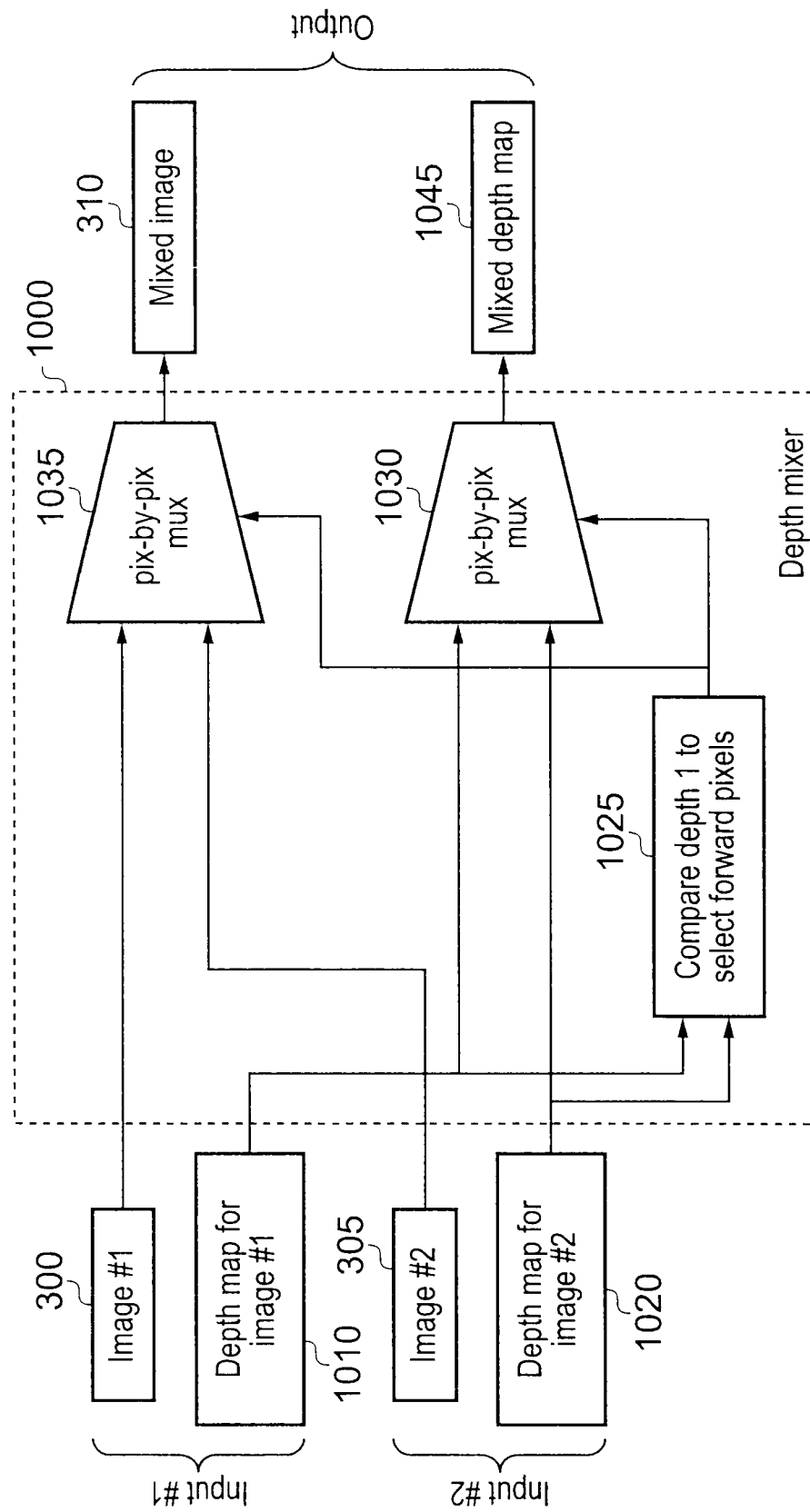
FIG. 1 shows a prior art multiplexing apparatus for 2D image signals.

Similarly, the second image 305 has a left eye image 305A intended for the viewer's left eye and a right eye image 305B intended for the viewer's right eye. Again a depth map for each of the left eye image and the right eye image is provided in 1020A and 1020B. So, in order to implement the mixing editing in 3D, two 2D apparatuses 1000 of FIG. 1 are used. This arrangement is shown in detail in FIG. 2.

In FIG. 2, there is shown a mixing apparatus 1000A which generates the left eye image and a mixing apparatus 1000B which generates the right eye image. The left and right eye images should, ideally for unoccluded objects, be identical except for horizontal displacement. The depth map for the left eye version of the first image 1010A and the depth map for the left eye version of the second image 1020A are provided to the mixing apparatus for the left eye image. Similarly, the depth map for the right eye version of the first image 1010B and the depth map for the right eye version of the second image 1020B are provided to the mixing apparatus 1000B. As the left eye version of the first image and the right eye version of the first image are of the same scene, the objects within that scene should be at the same depth. Similarly, the left eye version of the second image and the right eye version of the second image are of the same scene all objects within that scene should be at the same depth. However, the depth maps for each of the left hand version of the first and second image and the right hand version of the first and second image are all generated independently of one another.

Figure 4:
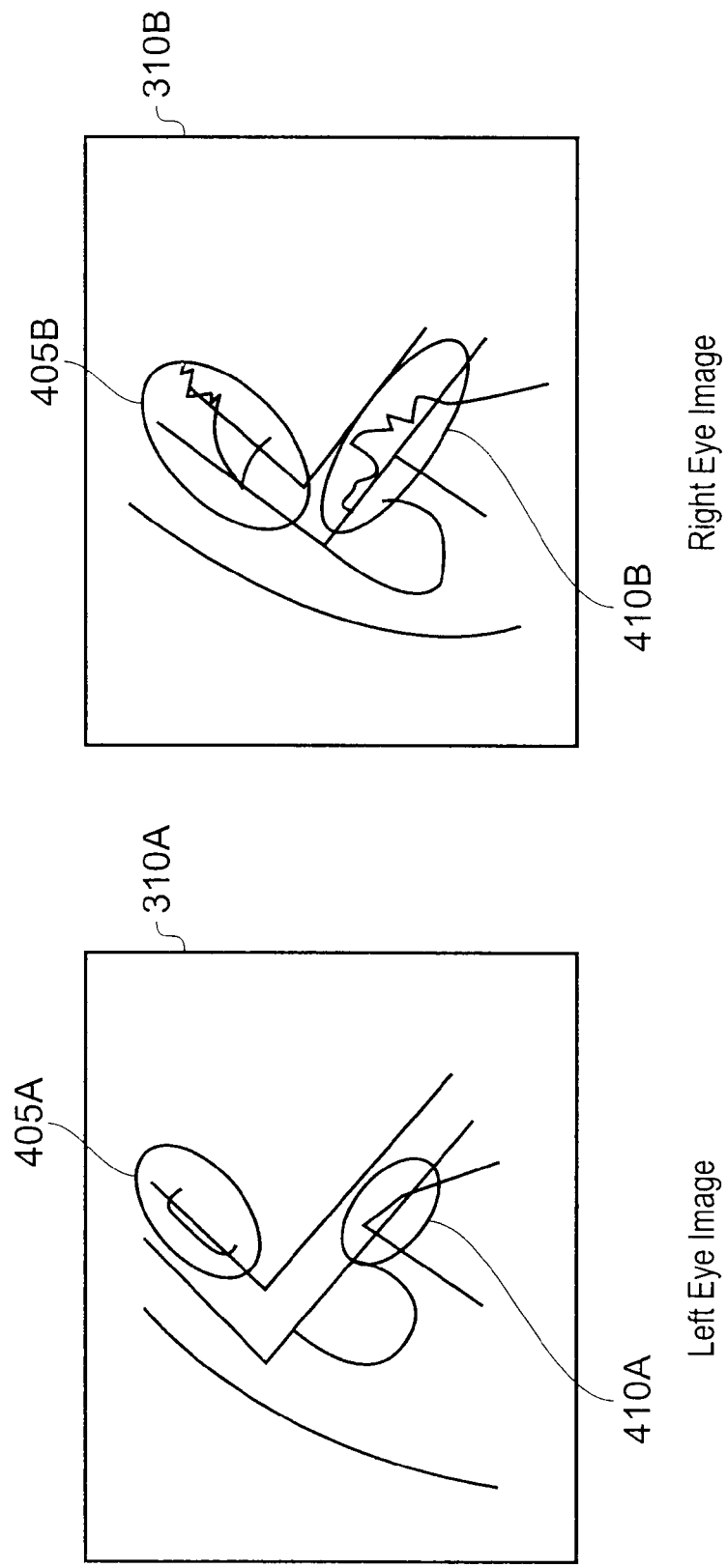
FIG. 4 shows a resultant image signal from the apparatus of FIG. 2.

As the depth maps are not always perfectly accurate the arrangement of FIG. 2 has a previously unrecognised problem as illustrated in FIG. 4 which have been addressed.

In the mixed left hand image created by mixing apparatus 100A, at pixels near the boundary between the house from the first image 300A and the mask from the second image 305A, the mixed depth map may take values at this point from the depth map for the first image. However, at the corresponding pixels in the mixed right hand image, the mixed depth map may take values from the depth map for the second image. The resultant image is shown in detail in FIG. 4.

Specifically, in FIG. 4, an area showing the intersection of the mask with the house is shown in detail. In the mixed left eye image 310A, the boundary between the house and the mask has one profile (405A 410A). However, in the mixed right eye image 310B, although the boundary (405B 410B) between the house and the mask should have an identical, although horizontally displaced, boundary does not. This means that in some parts of the boundary in one eye, the mask will look to be in front of the house, whereas in the same parts of the boundary in the other eye, the mask will look to be behind the house. This discrepancy will cause discomfort for the viewer when they view the image in 3D.

Embodiments of the present invention aim to address this issue. Further, the depth maps created for each image are computationally expensive to produce if the depth map is to be accurate. Clearly, it is advantageous to further improve the accuracy of depth maps to improve the enjoyment of the user and to help avoid discrepancies occurring in the images. It is also an aim of embodiments of the present invention to address this issue as well.

Figure 5:
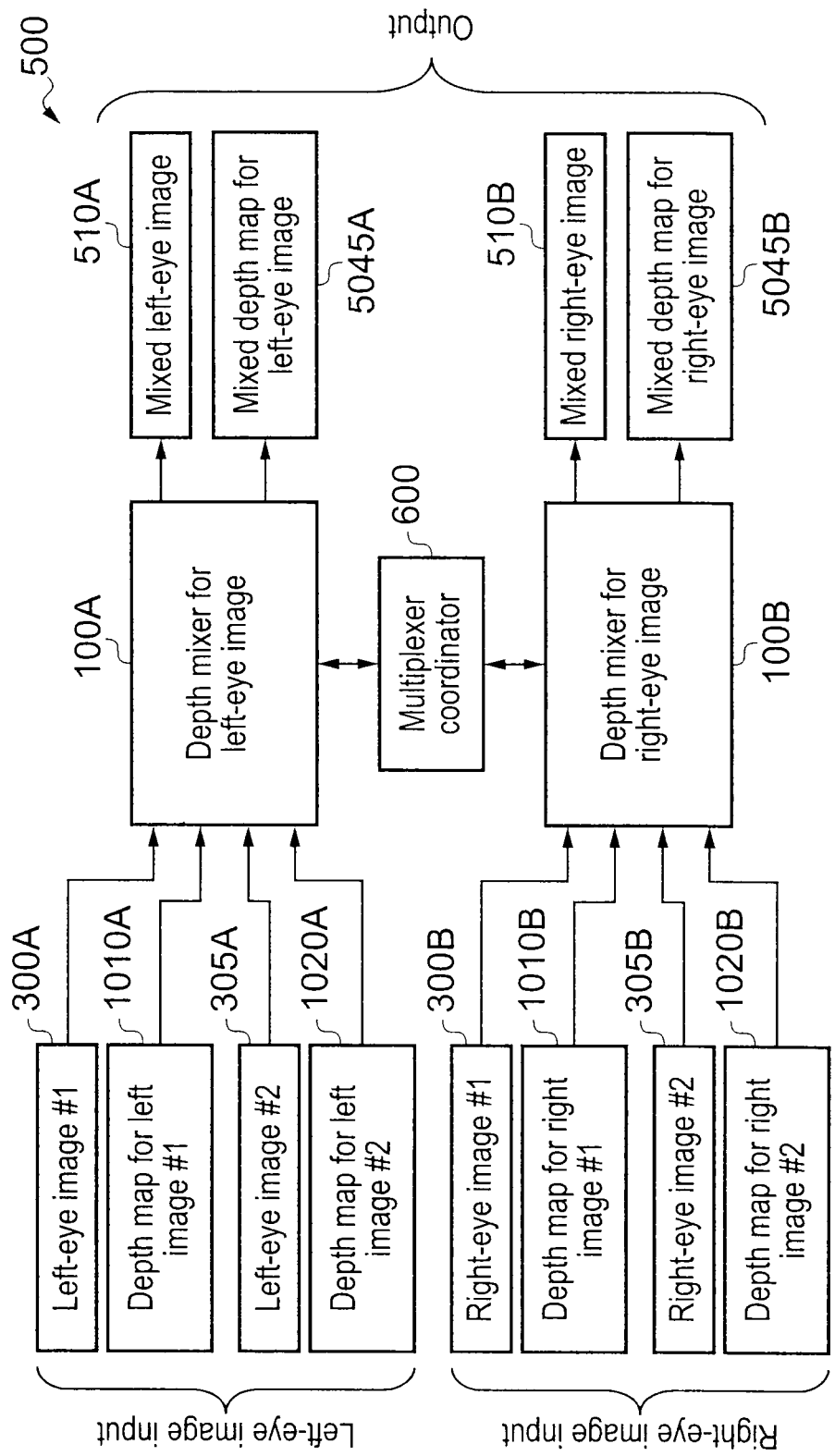
FIG. 5 shows a multiplexing apparatus for 3D image signals according to embodiments of the present invention.

The apparatus of FIG. 5 shows a multiplexing apparatus 500 for 3D image signals according to an embodiment of the present invention. In FIG. 5, like reference numerals refer to like features explained with reference to FIG. 2. The function of the like features will not be explained hereinafter.

As can be seen from FIG. 5, the apparatus according to embodiments of the present invention contain all the features of FIG. 2 with an additional multiplexor coordinator 600. Additionally, the function of the multiplexor coordinator 600 means that the mixed depth map for the left hand image 5045A and the mixed depth map for the right hand image 5045B, and the resultant left and right hand mixed images 510A and 510B will be different to those of FIG. 2.

Figure 6:
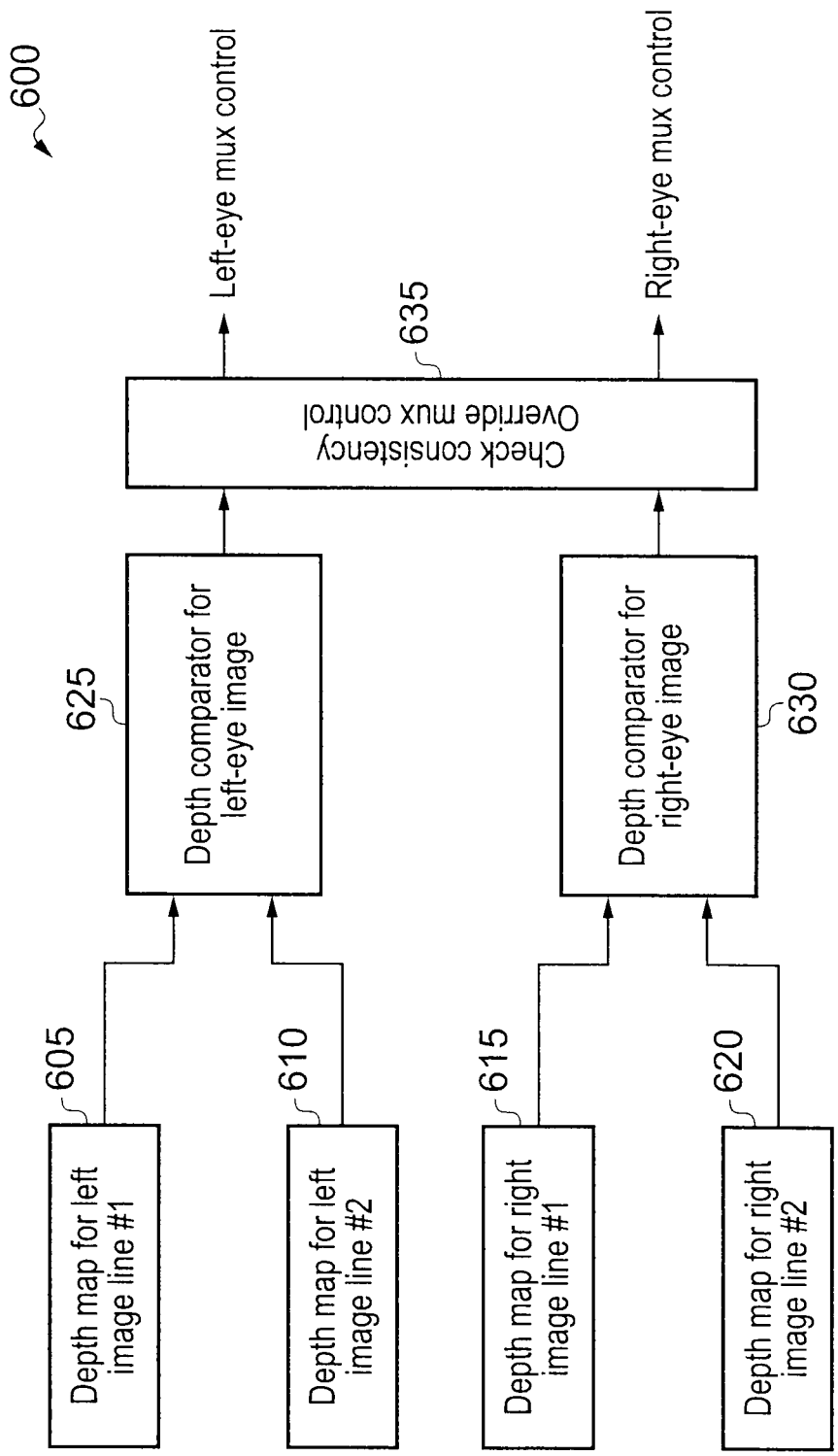
FIG. 6 shows a more detailed diagram of a multiplexing co-ordinator of FIG. 5.

The multiplexor coordinator 600 is connected to both the left eye mixing apparatus 100A and the right eye mixing apparatus 100B. The function of the multiplexor coordinator 600 will be described with reference to FIG. 6.

The multiplexor coordinator 600 is provided with the depth map for the left hand version of the first image 605 and the depth map for the left hand image of the second image 610. Similarly, the multiplexor coordinator 600 is provided with the depth map for the right hand version of the first image 615 and the depth map for the right hand version of the second image 620. A detailed description of the production of a disparity map (from which the depth map is created) will be provided later, although it should be noted that the invention is not so limited and any appropriately produced depth map or disparity map may be used in embodiments of the present invention.

As would be appreciated by the skilled person, although the foregoing is explained with reference to a depth map, there would need to be logic included which selects corresponding pixels in each of the left and right eye image. In other words, the left eye image and the right eye image are displaced from one another and so there is included in FIG. 6 (although not shown), logic which determines which pixels correspond to which other pixels. This type of logic is known and so will not be explained hereinafter. In this case, the depth information may be disparity information.

The depth map for the left hand version of the first image 605 is compared with the depth map for the left hand version of the second image 610 in a depth comparator for the left eye image 625. The depth comparator for the left eye image 625 determines, for each pixel position along a scan line, whether the resultant left eye image should have the appropriate pixel from the left hand version of the first image or the appropriate pixel from the left hand version of the second image as the foreground pixel. Similarly, the depth comparator for the right eye image 630 determines, for each pixel position (for example, along a scan line), whether the resultant right eye image should have the appropriate pixel from the right hand version of the first image or the appropriate pixel from the right hand version of the second image as the foreground pixel. It should be noted here that although the foregoing refers to a scan line, the invention is not so limited.

The output of each comparator may be a depth value which indicates the difference in depth values. Alternatively, the output from each comparator may be any other type of value which indicates to a subsequent multiplexor controller 635 which of the depth maps each comparator selects. For example, the output from each depth comparator may be a 1 or 0 identifying which depth map should be used. The selection made by the depth comparator for the left eye image 625 and the selection made by the depth comparator for the right eye image 630 are input in a multiplexor controller 635. The output of the multiplexor controller 635 is a signal which controls the mixing apparatus for the left eye 100A and the mixing apparatus for the right eye 100B to use the same pixel as foreground pixel for each corresponding pixel pair. In other words, the perceived depth of a pixel in the left eye resultant image, and the perceived depth of the corresponding (or horizontally displaced) pixel in the right eye resultant image is the same. This addresses the problem noted above where the corresponding pixels in the left and right eye versions of the mixed image have different depths and thus different pixels are used as the foreground pixel.

Where there is disagreement in the depth maps for a given pixel, the multiplexor controller 635 selects one of the depth maps as the depth of the pixel. This is in dependence on the value of the output from each comparator. In one embodiment, the multiplexor controller 635 applies that depth value to the pixel in the other mixing apparatus. Alternatively, the output pixel may be selected purely on the basis of the output from each comparator.

In order to generate a depth signal the multiplexor controller 635 may work in a number of different ways. Firstly, the multiplexor controller 635 may simply select one depth map value from one of the versions of the first image and use this as the depth in the other version of the first image. Similarly, the multiplexor controller 635 may simply select one depth map value from one of the versions of the second image and use this as the depth in the other version of the second image. Alternatively, the multiplexor controller 635 can calculate the error in the depth of each result and select the depth which has the lowest error. Techniques for determining this are known to the skilled person. Additionally, the selection may be random. Alternatively, the same depth value may be use for a predetermined number of subsequent frames. This stops the change of foreground pixels between successive frames which would cause discomfort. The pixels with the lowest intensity may be selected as being the foreground object. This will again stop the user feeling discomfort. As a further alternative, a depth which is the mean average of the two dissimilar values may be selected as the depth of the corresponding pixels.

If the multiplexor controller 635 simply selects the correct pixel on the basis of the outputs of the comparators, a simple instruction instructing the respective mixers 100A and 100B to use the same pixel may be issued.

Although the above has been described with reference to mixing two 3D images, the invention is not so limited. For example, it is possible to use the above technique to mix a 2D image (such as a logo) with a 3D image. For each pixel in the 2D image a depth is provided. Indeed, with the above technique two images can be edited together using the depth plane. For example, one image may wipe to a second image using the depth plane. This will be referred to hereinafter as a "z-wipe".

Z-Wipe

Although the foregoing has been explained with reference to stereo pairs, the selection of a foreground pixel given a depth map for two images which are to be mixed together is not so limited. By mixing two images using the depth plane information, it is possible to perform numerous effects using the depth plane of the image. For example, it is possible to wipe from one image to another image using the depth plane. In other words, it is possible to create an editing technique where it appears to the viewer that one image blends into another image from behind. Additionally, it is possible to wipe from one image to another image only at a certain position in the depth plane. Alternatively, one may use the depth plane as a key for editing effects. For example, it may be possible to place one image over another image only at one depth value. This may be useful during live broadcasts where presently chroma keying (commonly called blue or green screening) is used. One image, such as a weather map, would be located at a depth position and the above technique would select, for each pixel position, whether the image of the weather presenter or the weather map would be in the foreground. Clearly, many other editing techniques could be envisaged using the depth plane as would be appreciated by the skilled person.

Depth Map Generation

As noted above, in embodiments of the present invention, the depth map will be generated. The depth of each pixel point in the image can be generated using a number of predetermined algorithms, such as Scale Invariant Feature Transform (SIFT). However, these depth maps are either very densely populated and accurate but slow to produce, or not so densely populated but quick and computationally efficient to produce. There is thus a need to improve the accuracy and density of produced depth maps whilst still ensuring that the depth maps are producing computationally efficiently. An aim of embodiments of the present invention is to address this.

Figure 7:
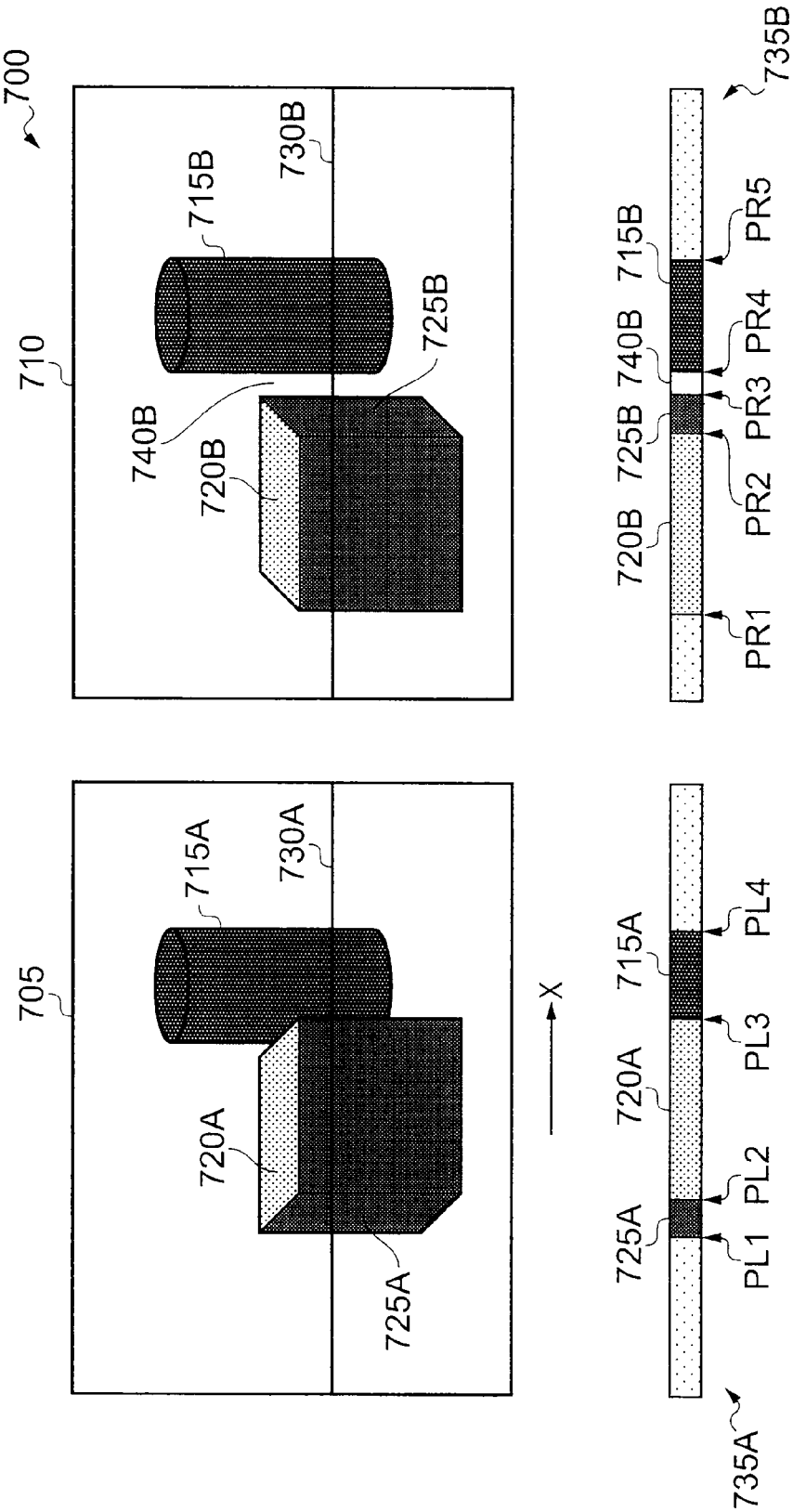
FIG. 7 shows a detailed diagram showing the generation of a disparity map according to embodiments of the present invention.

FIG. 7 shows a stereo image pair 700 captured using a stereoscopic camera having a parallel lens arrangement. In the left eye image 705, there is a cube 720A and a cylinder 715A. As will be apparent, from the left eye image 705, the cylinder 715A is slightly occluded by the cube 720A. In other words, in the left eye image 705 the cube 720A is positioned in front of the cylinder 715A and slightly obstructs the left eye image 705 from seeing part of the cylinder 715A. The right eye image 710 captures the same scene as the left eye image 705 but from a slightly different perspective. As can be seen, the cube 720B is still located in front of the cylinder 715B but in the right eye image 710, the cube 720B does not occlude the cylinder 715B. In fact there is a small portion of background 740B between the cube 720B and cylinder 715B. As will be also seen, the left side of the cube 725A is visible in the left eye image 705 but is not visible in the right side image 710. Similarly, the right side of the cube 725B is visible in the right eye image 710 but is not visible in the left eye image 705.

In order to determine the depth of each pixel in the left eye image 705 and the right eye image 710, the disparity between corresponding pixels needs to be determined. In other words, one pixel position in the left eye image 705 will correspond to a part of the scene. The same part of the scene will be at a pixel position in the right hand image 710 different to the pixel position in the left eye image 705. The difference in the number of pixels is termed the disparity and will give an indication of the depth of the part of the scene from the camera capturing the image. This, over the entire image, provides the depth map for the image.

In embodiments of the present invention, the same scan line is taken from the left image eye 730A and the right eye image 730B. The reason the same scan line is used is because in stereoscopic images, only horizontal disparity should exist in epipolar rectified images. In other words, the left and right eye image should be vertically coincident with only disparity occurring in the horizontal direction. It should be noted that to ensure only a single pixel scan line can be used, the images are epipolar rectified during preprocessing. However the invention is not so limited. It is envisaged that although one scan line one pixel deep will be described, the invention is not so limited and a scan line of any depth may be used. A deeper scan line may be useful to increase the stability of the results.

Figure 8:
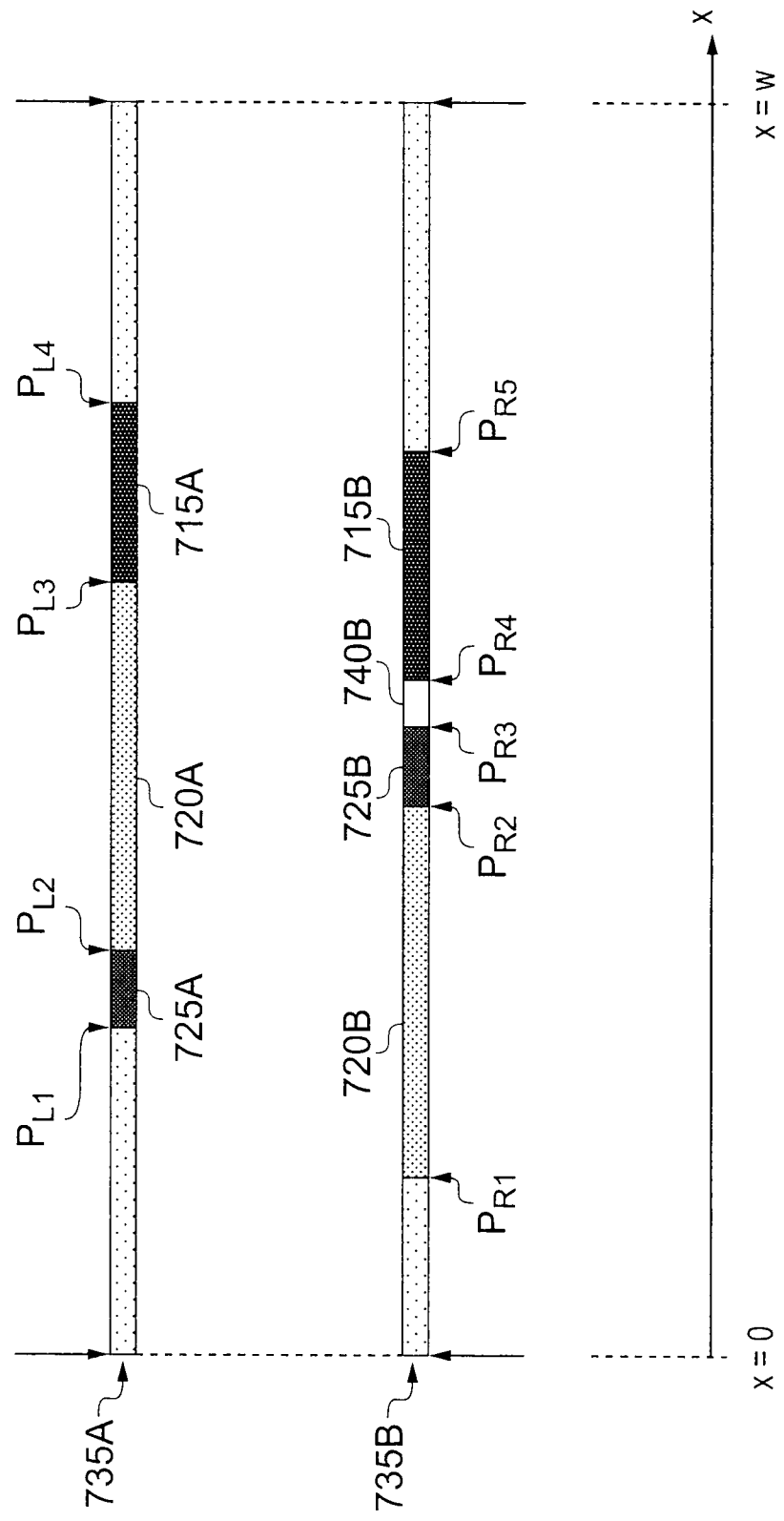
FIG. 8 shows a detailed diagram of a scan line for the generation of a disparity map according to embodiments of the present invention.

The results of the left eye scan line 735A and a right eye scan line 735B is shown in FIG. 8. As can be seen in the left hand scan line 735A, and looking in the x direction, the background changes to the left side of the cube 725A at point PL1. The left side of the cube 725A changes to the front face of the cube 720A at point PL2. The front face of the cube 720A changes to the cylinder 715A at point PL3. The cylinder 715A changes to the background again at point PL4.

As can be seen in the right hand scan line 735B, and looking in the x-direction, the background changes to the face of the cube 720B at point PR1. The face of the cube 720B changes to the right side of the cube 725B at point PR2. The right side of the cube 725B changes to the background at point PR3. The background changes to the cylinder 715B at point PR4 and the cylinder changes to the background at point PR5.

In the left eye image, points PL1 to PL4 are detected and in the right eye image, points PR1 to PR5 are detected. In order to detect these points, the change in intensity between horizontally adjacent pixels is measured. If the change in intensity is above a threshold, the point is detected. Although the intensity difference is used in embodiments, the invention is not so limited and the change in luminance or colour or indeed any image property may be used to detect the change point. Method of determining the change point exists in the Art and so will not be described hereinafter. It is next necessary to detect in the left and right scan lines which segments correspond to the most forward object, i.e. the object closest to the camera. In the example of FIG. 7, segment 720A in the left eye image 705 and segment 720B in the right eye image 710 need to be detected. This is because the most forward object in an image will not be occluded in either the left or right image, assuming of course that either segment of the most forward object does not extend beyond the scan line.

In order to reduce the amount of computation required to determine the corresponding segments, the disparity between each change point in the left eye image (PL1 to PL4) and each change point in the right eye image (PR1 to PR5) is determined. This is better seen in FIG. 8. This determination of the disparity enables certain segments which cannot correspond to each other to be ignored in calculating correspondence pixels. Referring to the position of the change points on the scan line for the left eye image, only change points appearing to the left hand side of the corresponding position in the scan line for the right eye image can correspond to the change point in the left hand image. Therefore, when comparing the change points in the left hand scan line, only change points to the left hand side of the change point in the right hand image will be compared. For example, when finding a change point in the right hand scan line that corresponds to change point PL2, only PR1 can be the corresponding change point. Similarly, when finding a change point that corresponds to point PL3, it is only necessary to check the similarity between change point PL3 and change points PR1, PR2, PR3 and PR4.

In fact, the amount of computation may be reduced further by only checking change points in the right hand image scan line that are within a predetermined distance from the change point in the left hand image that is under test. For example, to find the change point in the right hand image that corresponds to PL3, only the change points that lie within an upper disparity threshold are checked. In other words, only the change points in the right hand scan line that are within a certain number of pixels to the left of the change point in the right hand scan line are checked. The threshold may be selected according to the depth budget of the images or the interocular distance of the viewer or any other metric may be selected.

A method for improving the segmentation process will be described. In order to obtain accurate segmentation, the use of a mean shift algorithm is known. However, as would be appreciated by the skilled person, although accurate, the mean shift algorithm is processor intensive. This makes the mean shift algorithm difficult to implement in real time video. In order to improve the segmentation, therefore, it is possible to use a less intensive algorithm to obtain an idea where the segment boundaries lie in an image, and then apply the mean shift algorithm to those boundary areas to obtain a more accurate position for each segment boundary.

So, in one embodiment, the input image may have a simple edge detection algorithm applied thereto to obtain an approximate location for edges in the image.

After edge detection, the edge detected image is then subject to dilation filtering. This provides two areas. The first areas are areas which are contiguous. These are deemed to belong to the same segment. The second type of areas is areas surrounding the detected edges. It is the second type of areas that are then subjected to the mean shift algorithm. This improves the accuracy of the results from the edge detection process whilst still being computationally efficient.

One further embodiment in which to improve segmentation will now be described. After edge detection of the input image, the edge detected image is divided into smaller regions. These regions may be of the same size, or may be of different sizes. Then the dilation filtering may be applied to the image region by region (rather than just along the edges as previously). After the dilation filtering, the mean shift algorithm is applied to the areas which were subjected to dilation filtering. The segmentation is now complete.

In order to determine the forward most object, the pixels adjacent to the change point in the left hand scan line are compared to the pixels adjacent to the appropriate change points in the right hand scan line. "Adjacent" in this specification may mean directly adjacent i.e. the pixel next to the change point. Alternatively, "adjacent" may mean in this specification within a small number of pixels such as two or three pixels of the change point, or indeed may mean within a larger number of pixels of the change point. For forward most objects, or segments, the pixels to the right hand side of point PL2 and PR1 will be most similar and the pixels to the left of point PL3 and PR2 will be most similar. In other words, the pixels at either end of the segment will be most similar. After all the change points in the left hand scan line and the right hand scan line have been calculated and compared with one another, the forward most segment is established.

The validity of the selection of the forward most segment in each image may be verified using the values of disparity of pixels adjacent to the forward most segment in each image. As the forward most segment is closest to the camera in each image, the disparity between the pixel to the left of change point PL2 and its corresponding pixel in the right hand scan line will be less than or equal to the disparity between the pixel to the right of change point PL2 and its corresponding pixel in the right hand scan line. Similarly, the disparity between the pixel to the right of change point PL3 and its corresponding pixel in the right hand scan line will be less than or equal to the disparity between the pixel to the left of change point PL3 and its corresponding pixel in the right hand scan line. Similarly, the disparity between the pixel to the left of change point PR1 and its corresponding pixel in the left hand scan line will be less than or equal to the disparity between the pixel to the right of change point PR1 and its corresponding pixel in the left hand scan line. Similarly, the disparity between the pixel to the right of change point PR2 and its corresponding pixel in the left hand scan line will be less than or equal to the disparity between the pixel to the left of change point PR2 and its corresponding pixel in the right hand scan line.

After determining the most forward object and verifying the result, it is possible to determine a part occluded object. A part occluded object is an object which is part visible to either the left or right hand eye image, but is partly overlapped in the other eye image. Cylinder 715A is therefore part occluded in the left eye image and is not occluded in the right eye image.

As the skilled person will appreciate, where there is part occlusion of an object, there is no disparity information available because one image (the left eye in this example) does not include the object for comparison purposes. Therefore, it is necessary to estimate the disparity. This is explained with reference to FIG. 9.

Figure 9:
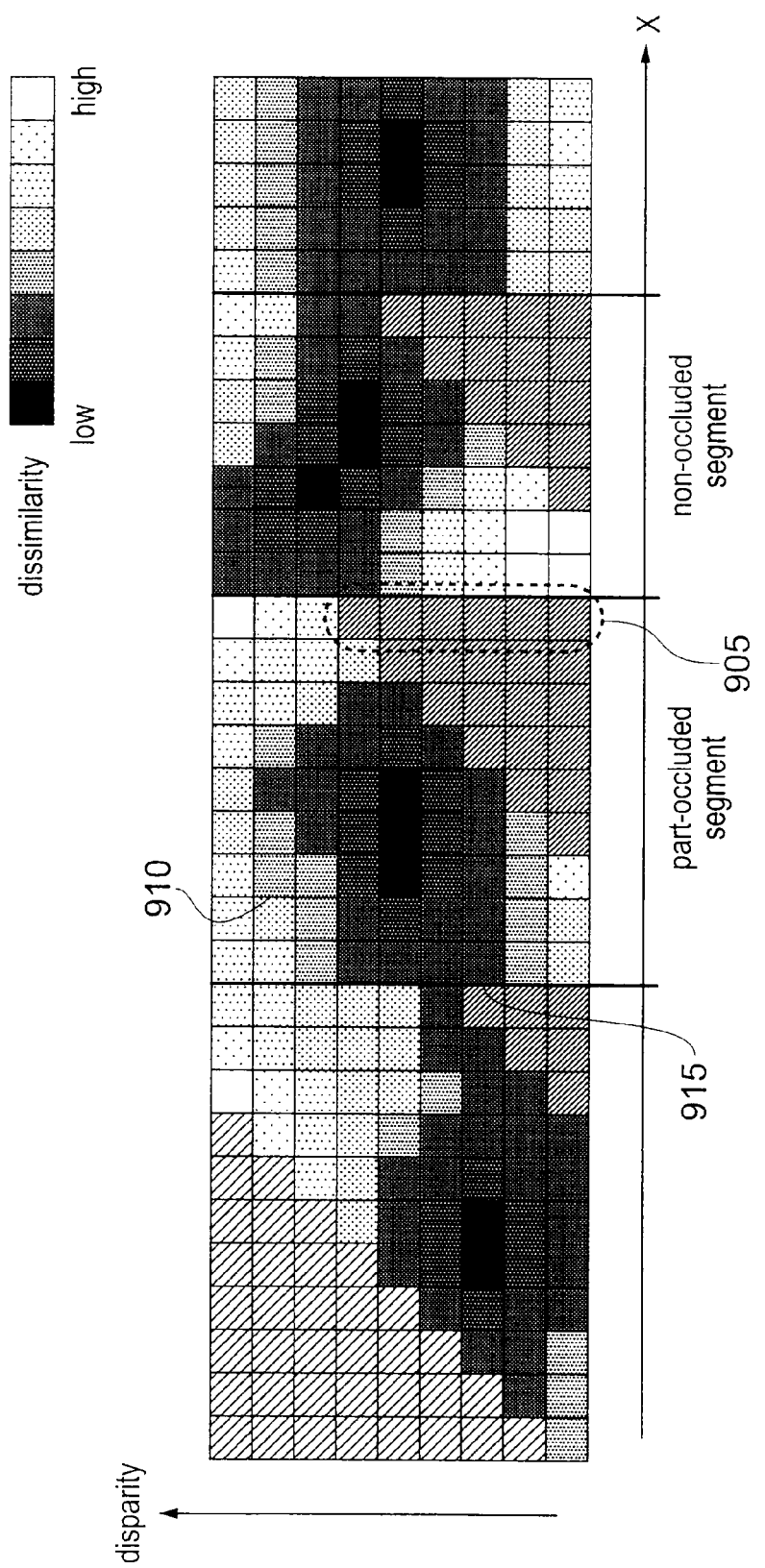
FIG. 9 shows a detailed diagram of a horizontal position vs dissimilarity matrix showing a part occluded object.

FIG. 9 shows a dissimilarity map for each pixel position on a scan line. In other words, FIG. 9 shows a map which for each pixel position along the x-axis shows how similar, or dissimilar, pixels at a given disparity from the pixel position are. So, in FIG. 9, along the x axis shows pixel positions on a scan line for, say, the left eye image (although the invention is not so limited). Along the y axis shows the similarity in the right eye image between the pixel at the position on the scan line in the left eye image and each pixel position at increasing disparity in the left eye image. The maximum disparity is set by the depth budget of the scene as previously noted.

Looking at the origin of the dissimilarity map (in the bottom left corner of the map), only one pixel has a disparity value. This is because at this position in the left hand image, all pixels to the left of this point (i.e. having a disparity of one) will be out of bounds of the left hand scan line and so cannot be measured. This is indicated by a hashed line.

As would be appreciated, the change points in the map are shown as thick black lines at each pixel position in the left hand scan line compared with the right hand image. It would be appreciated though that this is only an example and a comparison of any scan line with any image is envisaged. As can be seen, the non-occluded segment (which is closest to the camera) is determined in accordance with the previous explanation. However, as noted before, the segment to the immediate right of the non-occluded segment in the right scan line and to the immediate left of the non-occluded segment in the left scan line may be part occluded.

In order to determine the disparity at any point in the occluded area, it is necessary to determine which section of the part occluded segment is occluded and which part is visible. Therefore, the similarity of the left hand pixel nearest to the right hand edge of the part occluded segment is determined. As can be seen from section 905 as the cells in the column upon which 905 lay, because the cells in 905 are occluded by the adjacent non-occluded segment they cannot match and the cells above 905 in the same column has large dissimilarities. This indicates that this section of the part occluded segment is occluded. Such analysis takes place for all pixel positions in the segment to the immediate left of the forward most object in the left scan line.

As can be seen, the similarity map shows that a number of pixels within the part occluded segment have high similarity (or low dissimilarity) values. The pixel at position 910, is closest to the most forward segment which shows the most similarity. Additionally, pixel position 915 is the right hand pixel closest to the left hand edge of the part occluded segment. In order to determine the disparity at any point within the part occluded segment, therefore, a straight line, for example, is drawn between pixel position 910 and pixel position 915. Then the disparity for each pixel position is then estimated from this straight line. Although a straight line is shown, the invention is not limited to this. The disparity line may be determined in accordance with the measured levels of dissimilarity or levels of similarity. For example, the line may be defined by a least squares error technique. Indeed, any suitable technique is envisaged.

It is envisaged that the above method may be performed on a computer. The computer may be run using computer software containing computer readable instructions. The computer readable instructions may be stored on a storage medium such as a magnetic disk or an optical disc such as a CD-ROM or indeed may be stored on a network or a solid state memory.

Moreover, although the foregoing has been described with reference to a stereoscopic image captured using a parallel arrangement of camera lenses, the invention is not so limited. The stereoscopic image may be captured using any arrangement of lenses. However, it should be converted into parallel images according to embodiments of the present invention.

Although the foregoing has mentioned two examples for the provision of depth information, the invention is no way limited to depth maps and disparity maps. Indeed any kind of depth information may be used.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the claims.

I claim:

1. A method of detecting disparity between corresponding pixel positions in a first and second image capturing the same scene, the first and second image being viewable as a stereoscopic image captured using a parallel lens arrangement, the method comprising the steps of:
    determining the pixel positions of a plurality of points of change of an image property across a section of the first image;
    determining the pixel positions of a plurality of points of change of said image property across a corresponding section of the second image;
    comparing the position of one of the points of change in the first image with a subset of the positions of the plurality of points of change of the second image, whereby the subset is determined in accordance with the pixel positions of the points of change in the second image relative to the pixel position of the one of the points of change in the first image and a number of positions of the plurality of points of change of the second image within the subset of the positions of the plurality of points of change of the second image is less than a number of positions of the plurality of points of change of the second image determined;
    determining the similarity between pixels which have a pixel position adjacent to the point of change in the first image, and the corresponding pixels adjacent to each of the points of change in the subset; and
    obtaining the disparity in accordance with the determined similarity of the pixels.

2. The method according to claim 1, wherein the subset is determined as being within a predetermined number of pixels of the one of the points of change in the first image.

3. The method according to claim 2, wherein the predetermined number of pixels is determined in accordance with the depth budget of the captured scene.

4. The method according to claim 1, comprising defining a non-occluded segment between the one point of change in the first image and an adjacent second point of change in the first image wherein pixels adjacent the one point of change and the pixels adjacent the second point of change have a similarity to the pixels adjacent corresponding points of change in the subset which is above a threshold value; and
    defining a part occluded section as being a segment adjacent to the non-occluded segment in accordance with a predetermined criterion.

5. The method according to claim 4, comprising determining the similarity of an image property of the pixels in the part occluded section in the first image with pixels in the second image located at pixel positions horizontally displaced to the pixels in the part occluded section in the first image;
    determining the respective ends of the part occluded section as being the pixel closest to the respective change points defining the part occluded section that have a similarity above a threshold.

6. The method according to claim 5, comprising defining a line between the pixels at the respective ends of the part occluded section, wherein the disparity at any pixel position in the part occluded section is determined in accordance with the defined line.

7. A non-transitory medium storing a computer program containing computer readable instructions which, when loaded onto a computer, configure the computer to perform the method according to claim 1.

8. The non-transitory medium of claim 7, wherein the medium is a storage medium.

9. An apparatus for detecting disparity between corresponding pixel positions in a first and second image capturing the same scene, the first and second image being viewable as a stereoscopic image captured using a parallel lens arrangement, the apparatus comprising:
    a determiner operable to determine the pixel positions of a plurality of points of change of an image property across a section of the first image and to determine the pixel positions of a plurality of points of change of said image property across a corresponding section of the second image;
    a comparator operable to compare the position of one of the points of change in the first image with a subset of the positions of the plurality of points of change of the second image, whereby the subset is determined in accordance with the pixel positions of the points of change in the second image relative to the pixel position of the one of the points of change in the first image and a number of positions of the plurality of points of change of the second image within the subset of the positions of the plurality of points of change of the second image is less than a number of positions of the plurality of points of change of the second image determined by the determiner;
    wherein the determiner is operable to determine the similarity between pixels which have a pixel position adjacent to the point of change in the first image, and the corresponding pixels adjacent to each of the points of change in the subset; and
    an obtainer operable to obtain the disparity in accordance with the determined similarity of the pixels.

10. The apparatus according to claim 9, wherein the subset is determined as being within a predetermined number of pixels of the one of the points of change in the first image.

11. The apparatus according to claim 10, wherein the predetermined number of pixels is determined in accordance with the depth budget of the captured scene.

12. The apparatus according to claim 9, comprising a definer operable to define a non-occluded segment between the one point of change in the first image and an adjacent second point of change in the first image wherein pixels adjacent the one point of change and the pixels adjacent the second point of change have a similarity to the pixels adjacent corresponding points of change in the subset which is above a threshold value; and to define a part occluded section as being a segment adjacent to the non-occluded segment in accordance with a predetermined criterion.

13. The apparatus according to claim 12, wherein the determiner is operable to determine the similarity of an image property of the pixels in the part occluded section in the first image with pixels in the second image located at pixel positions horizontally displaced to the pixels in the part occluded section in the first image;

and to determine the respective ends of the part occluded section as being the pixel closest to the respective change points defining the part occluded section that have a similarity above a threshold.

14. The apparatus according to claim 13, wherein the definer is operable to define a line between the pixels at the respective ends of the part occluded section, wherein the disparity at any pixel position in the part occluded section is determined in accordance with the defined line.

* * * * *